US009345028B1

(12) United States Patent
Pawar et al.

(10) Patent No.: US 9,345,028 B1
(45) Date of Patent: May 17, 2016

(54) TTI BUNDLING BASED ON COMMUNICATION TYPE

(71) Applicant: Sprint Spectrum L.P., Overland Park, KS (US)

(72) Inventors: Hemanth Pawar, Brambleton, VA (US); Daniel Vivanco, Sterling, VA (US); Shilpa Kowdley Srinivas, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 26 days.

(21) Appl. No.: 14/447,604

(22) Filed: Jul. 30, 2014

(51) Int. Cl.
*H04J 3/00* (2006.01)
*H04W 72/04* (2009.01)
*H04W 72/08* (2009.01)
*H04W 28/02* (2009.01)

(52) U.S. Cl.
CPC ...... *H04W 72/0446* (2013.01); *H04W 28/0278* (2013.01); *H04W 72/0413* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 2012/0207040 A1* | 8/2012 | Comsa | H04W 72/1215 370/252 |
| 2013/0083753 A1* | 4/2013 | Lee | H04W 72/0453 370/329 |
| 2013/0250924 A1* | 9/2013 | Chen | H04L 1/1819 370/336 |
| 2013/0343273 A1 | 12/2013 | Barbieri et al. | |
| 2014/0362832 A1* | 12/2014 | Rudolf | H04L 1/1822 370/336 |

* cited by examiner

Primary Examiner — Duc C Ho

(57) ABSTRACT

Disclosed herein is a method and corresponding system for TTI bundling based on communication type. The method may involve receiving an indication of a wireless communication, where the wireless communication may be of a particular quality of service and a particular type. The method may further involve responsive to receiving the indication, (i) determining the particular type of the wireless communication and (ii) determining, based at least in part on the determined particular type of the wireless communication, TTI bundling with a bundling size, N, should be invoked for transmitting data of the wireless communication, where N>1. And the method may involve responsive to determining that TTI bundling with the bundling size N should be invoked for transmitting data of the wireless communication, invoking TTI bundling with the bundling size N for transmitting the data of the wireless communication.

20 Claims, 10 Drawing Sheets

TTI BUNDLING BASED ON COMMUNICATION TYPE

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by a user equipment (UE) device in the Physical Uplink Shared Channel (PUSCH). Normally, a UE device transmits data in one transmission time interval (TTI), which corresponds to a 1 millisecond (ms) subframe, and then waits to receive a HARQ response before re-transmitting the data or transmitting additional data. However, when TTI bundling is used, the UE device transmits the same data four times in four consecutive TTIs and then waits to receive a HARQ response. In this way, the UE device can transmit four instances of the same data, which allows for more robust reception of the data, but without the delay that would be associated with the UE device transmitting the data four times and waiting for a HARQ response after each transmission.

OVERVIEW

In some wireless communication systems, a radio access network (RAN) may engage in wireless communication with one or more UEs via one or more bearers in a bearer group, with the bearer group being associated with one or more service classes. In some cases, wireless communication may be of a particular quality of service (QoS) class and each bearer that is established for a particular UE may be associated with the QoS class. In practice, a particular QoS class may include a plurality of types of wireless communication, such as types of communication applications running on a UE. And a particular type of communication application may include various particular communication applications.

LTE, for example, defines nine different QoS classes, and each QoS class is identified by a respective QoS Class Identifier (QCI). QCIs 1 through 4 may correspond to guaranteed bit rate types of wireless communication, such as conversational voice, conversational video, and real-time gaming. QCIs 5 through 9 may correspond to non-guaranteed bit rate types of wireless communication, such as IMS signaling, TCP-based communications (e.g., Web browsing, email, chat, FTP, etc.), as well as non-guaranteed bit rate voice and video services. In some situations, QCI 9 may correspond to the lowest QoS class.

In some implementations, TTI bundling may be based on the particular QoS class of the wireless communication. For instance, in some cases, a RAN may direct a UE to apply TTI bundling with a bundling size N for transmitting data of a wireless communication to the RAN based on the particular QoS class of the wireless communication. In practice, the bundling size N is the number of consecutive TTIs used. Thus, the bundling size N means the same data is transmitted N times in N consecutive slots before waiting for a HARQ response. In some situations, the bundling size N could be any number greater than 1.

As one example, the RAN may direct the UE to apply TTI bundling with a bundling size between 2 and 4 for transmitting data of the wireless communication to the RAN when the wireless communication has a QCI of 1. As another example, the RAN may direct the UE to apply TTI bundling with a bundling size between 2 and 4 for transmitting date of the wireless communication to the RAN when the wireless communication has a QCI of 9.

Applying TTI bundling based on the particular QoS class of the wireless communication may have drawbacks. For instance, in some situations, the RAN directing a UE to apply TTI bundling with a bundling size N for transmitting data of a particular wireless communication based on the particular QoS class of the particular wireless communication may cause the UE to apply TTI bundling with the bundling size N for transmitting data of other wireless communications.

For example, when the particular QoS class includes a plurality of types of wireless communications and the particular wireless communication is a particular type among the plurality of types, the RAN directing the UE to apply TTI bundling with the bundling size N for transmitting data of the particular wireless communication based on the particular QoS class may cause the UE to apply TTI bundling for (i) transmitting data of the particular wireless communication of the particular type and (ii) transmitting data of other wireless communications of the other types among the plurality of types. As a result, the UE applying TTI bundling with the bundling size N for transmitting both data of the particular wireless communication and data of other wireless communications may cause the UE's battery to deplete more quickly than when the UE applies TTI bundling with bundling size N for transmitting data of the particular wireless communication.

As another example, when multiple UEs transmit data of respective wireless communications to a RAN over a PUSCH channel, the particular QoS class includes a plurality of types of wireless communications, and the particular wireless communication is a particular type among the plurality of types, the RAN directing a particular UE among the multiple UEs to apply TTI bundling with a bundling size N for transmitting data of the particular wireless communication over the PUSCH channel based on the particular QoS class of the particular wireless communication may cause the particular UE to apply TTI bundling with the bundling size N for (i) transmitting data of the particular communication of the particular type and (ii) transmitting data of other wireless communications of the other types among the plurality of types. As a result, the UE applying TTI bundling with the bundling size N for transmitting both data of the particular wireless communication and data of other wireless communications may increase utilization of the PUSCH channel more than when the UE applies TTI bundling with bundling size N for transmitting data of the particular wireless communication. This, in turn, may delay data transmission over the PUSCH channel of some UEs among the multiple UEs due to uplink resource limitations.

Disclosed herein is a method and corresponding system to help overcome these and other concerns. In accordance with this disclosure, TTI bundling may be based on communication type. In that context, by way of example, a representative method may involve receiving into a RAN, over an air interface from a UE, an indication of a wireless communication. The wireless communication may be of a particular quality of service and a particular type. The method may further involve responsive to receiving the indication, (i) determining by the RAN the particular type of the wireless communication and (ii) determining by the RAN, based at least in part on the determined particular type of the wireless communication, that the RAN should invoke TTI bundling with a bundling size, N, for transmitting data of the wireless communication between the RAN and the UE. The bundling size N may be greater than 1. And the method may involve responsive to determining that the RAN should invoke TTI bundling with the bundling size N for transmitting data of the wireless communication between the RAN and the UE, the RAN invoking TTI bundling with the bundling size N for transmitting the data of the wireless communication between the RAN and the UE.

Further, a representative system may include a communication interface, a processing unit, and non-transitory data storage. And the system may include program instructions stored in the data storage and executable by the processing unit to carry out functions such as those described above.

These as well as aspects, advantages, and alternatives will become apparent to those of ordinary skill in the art by reading the following description, with reference where appropriate to the accompanying drawings. Further, it should be understood that this overview and the other description throughout this document are provided by way of example and are not intended to be limiting.

BRIEF DESCRIPTION OF THE DRAWINGS

Various exemplary embodiments are described herein with reference to the following drawings, in which like numerals denote like entities, and in which.

DETAILED DESCRIPTION

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
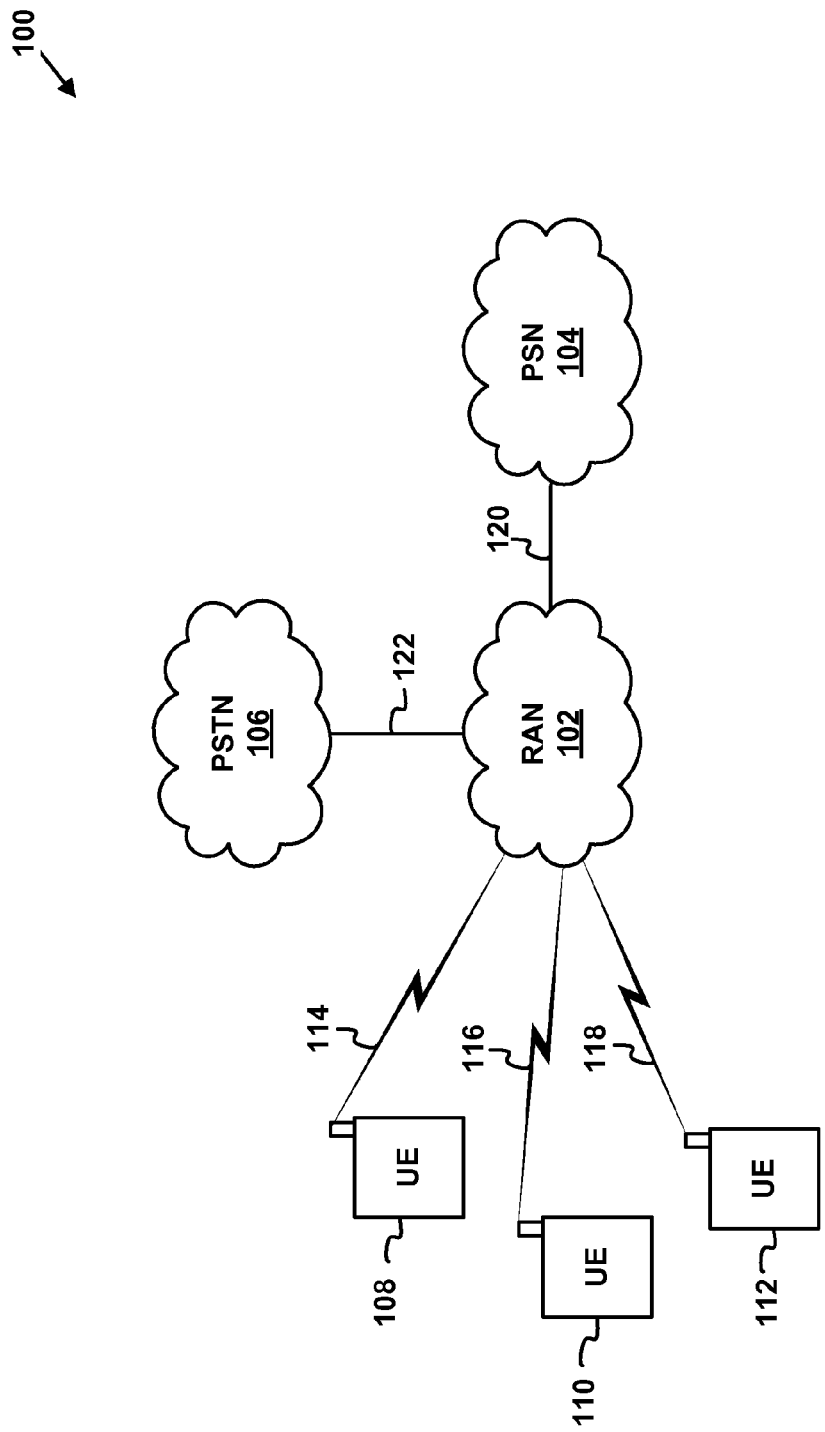
FIG. 1 depicts an example communication system.

Referring to the drawings, FIG. 1 depicts a communication system 100 that includes a RAN 102, a packet-switched network (PSN) 104, a public switched telephone network (PSTN) 106, and UEs 108, 110, and 112. Other entities could be present in addition to and/or instead of one or more entities depicted in FIG. 1, as this arrangement is presented by way of example. RAN 102 communicates with UEs 108, 110, and 112 via respective air interfaces 114, 116, and 118, with PSN 104 via a communication link 120, and with PSTN 106 via a communication link 122. Any or all of the communication links described herein may be bidirectional and may include one or more wired and/or wireless interfaces. Also, there could be one or more routers, switches and/or other devices or networks making up at least part of one or more of each of the communication links described herein.

UEs 108, 110, and 112 could be wireless telephones, wireless handheld, tablet, or laptop computers, or other types of wireless communication devices (WCDs). Although FIG. 1 shows RAN 102 in wireless communication with three UEs, it is to be understood that RAN 102 could be in communication with greater or fewer number of UEs. In addition, the number of UEs in wireless communication with RAN 102 can change over time, for example, as a result of one or more UEs moving into or out of the wireless coverage area of RAN 102 and/or as a result of one or more UEs beginning and ending communication sessions.

Each of air interfaces 114, 116, and 118 could include a respective uplink, with which a UE can transmit data of a wireless communication to RAN 102 (e.g., uplink communication), and a respective downlink, with which RAN 102 can transmit data of the wireless communication to the UE (e.g., downlink communication). The communications over air interfaces 114, 116, and 118 could conform to any wireless protocol now known or later developed. For purposes of illustration, the communications over air interfaces 114, 116, and 118 will be described herein with respect to the LTE protocol.

RAN 102 may provide access to PSN 104 and PSTN 106. As one example, PSN 104 may be the Internet. With this arrangement, a UE being served by RAN 102 may engage in a communication session, via RAN 102, with an endpoint connected to PSN 104 or PSTN 106. The endpoint could be, for example, another UE, a landline telephone, an email server, Web server, media server, or gaming server. The communication session could involve wireless communication of a particular QoS class and a particular type.

For instance, the wireless communication may be communication by a particular type of communication application running on a UE and the particular type of wireless communication includes the particular type of communication application. As examples, the particular type of communication application may include voice over IP (VoIP), streaming, Web video, Web browsing (e.g., Hypertext Transfer Protocol Secure (HTTPs) communications), tunneling, peer-to-peer, and online gaming. In addition, the particular type of communication application may include a particular communication application running on the UE. For instance, when the particular type of communication application includes streaming or Web video, the particular communication applications may include Netflix, YouTube, Hulu, Amazon, Pandora, etc. Further, the particular type of wireless communication may include software updates (e.g., software updates for the UE or for a communication application stored on the UE) or network storage. In other cases, the communication session could involve a background task, such as periodically registering with RAN 102.

Thus, when a UE, such as UEs 108, 110, or 112, is involved in a communication session, the UE may transmit data of a wireless communication over an uplink channel to RAN 102 and may receive data of the wireless communication from RAN 102 over a downlink channel. In some implementations, UEs 108, 110, and 112 may transmit data to RAN 102 over an uplink shared channel. The usage of the uplink shared channel may be controlled by RAN 102.

Figure 2A:
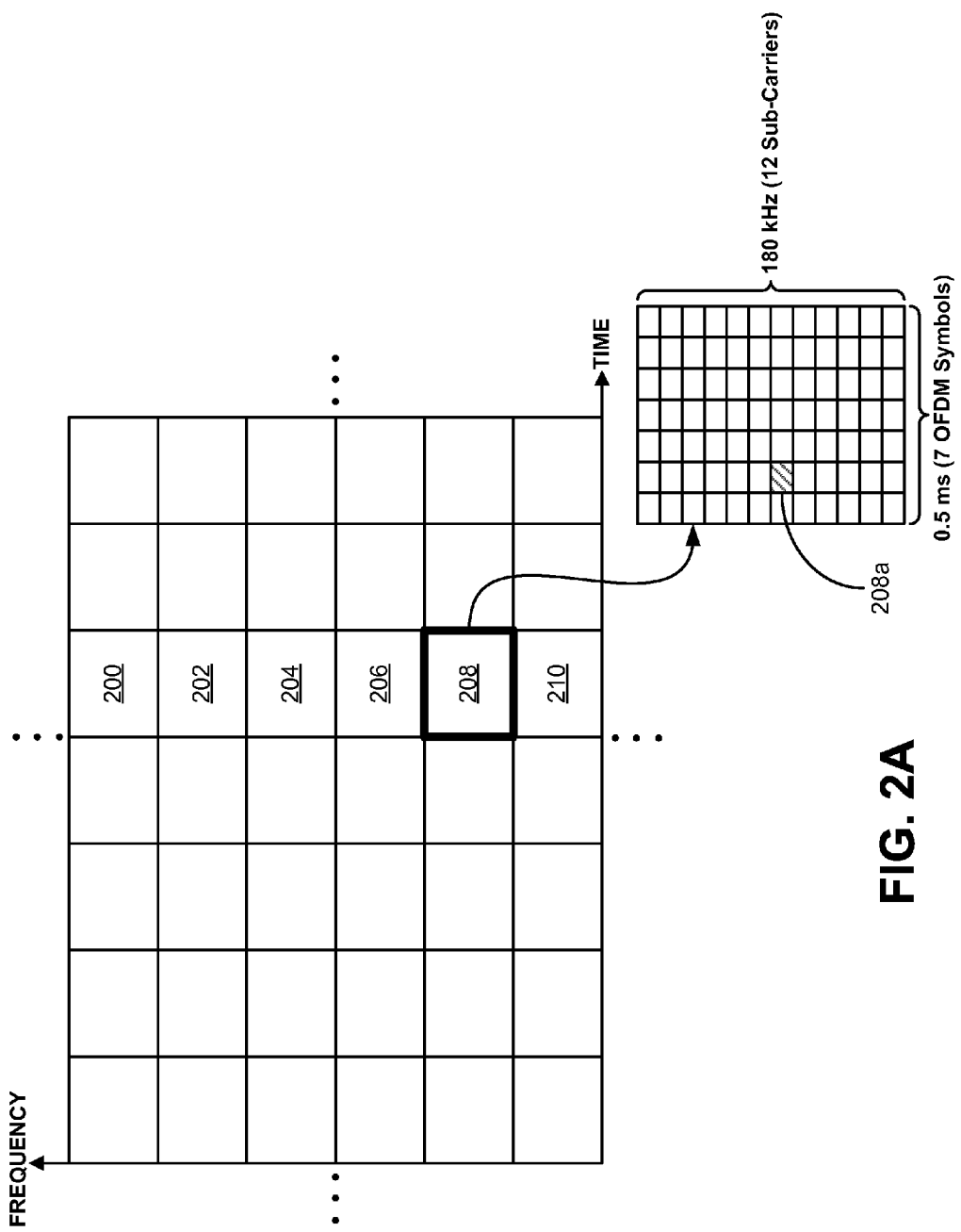
FIG. 2A is a conceptual illustration of a division of uplink resources into resource blocks, in accordance with an example embodiment.

For example, the LTE protocol defines a PUSCH that UEs can use to transmit data of wireless communications to RANs. Portions of the PUSCH may be allocated to particular UEs by allocating resource blocks. FIG. 2A illustrates how the uplink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols (e.g., seven OFDM symbols).

In the time domain, each resource block typically occupies a 0.5 ms slot of time. By way of example, FIG. 2A shows resource blocks 200-210 for a particular slot. In the frequency domain, each of resource blocks 200-210 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 200-210.

FIG. 2A also includes a more detailed view of uplink resource block 208. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 208 in FIG. 2A shows the division of the resource block into multiple resource elements, such as resource element 208a.

Figure 2B:
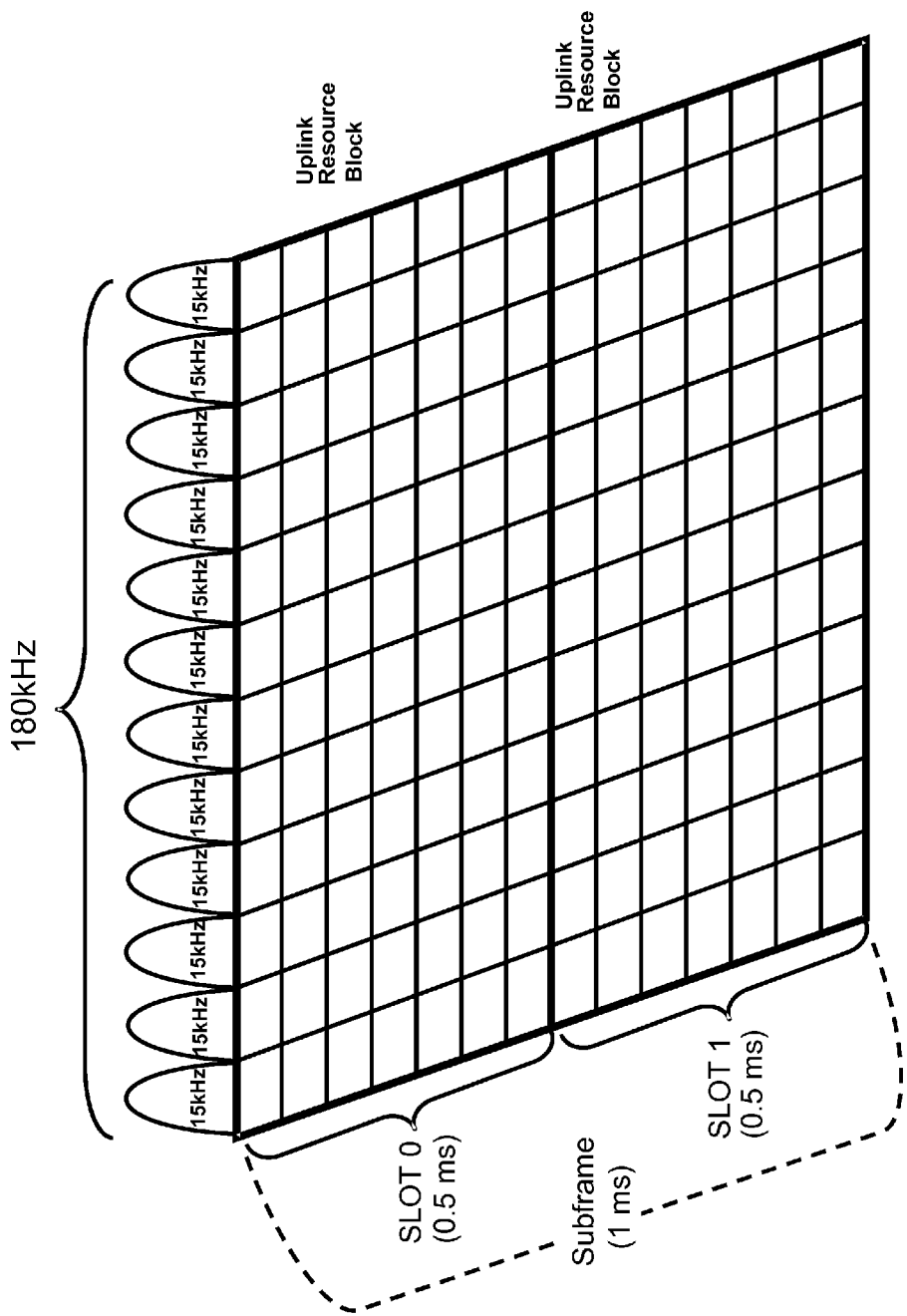
FIG. 2B is a conceptual illustration of two sequential uplink resource blocks, in accordance with an example embodiment.

A resource block may be allocated to a particular UE to transmit data in the uplink shared channel (PUSCH channel). For example, resource blocks 200 and 202 might be allocated to UE 108, resource blocks 204-208 might be allocated to UE 110, and resource block 210 might be allocated to UE 112. The allocation of resource blocks to UEs could be made by RAN 102. Further, resource blocks could be allocated to UEs based on the power headrooms reported by the UEs. RAN 102 may periodically evaluate, and potentially adjust, the allocation of resource blocks to WCDs. This evaluation may occur every subframe, wherein a subframe consists of two consecutive slots (i.e., a subframe is a 1 ms period of time). Thus, when a UE is allocated one or more resource blocks, that allocation may be maintained throughout a subframe (two consecutive slots). In subsequent subframes, the UE may be allocated a different number of resource blocks. FIG. 2B illustrates an uplink resource allocation for a UE that is maintained for two consecutive slots of time (Slot 0 and Slot 1) in a given subframe.

Figure 2C:
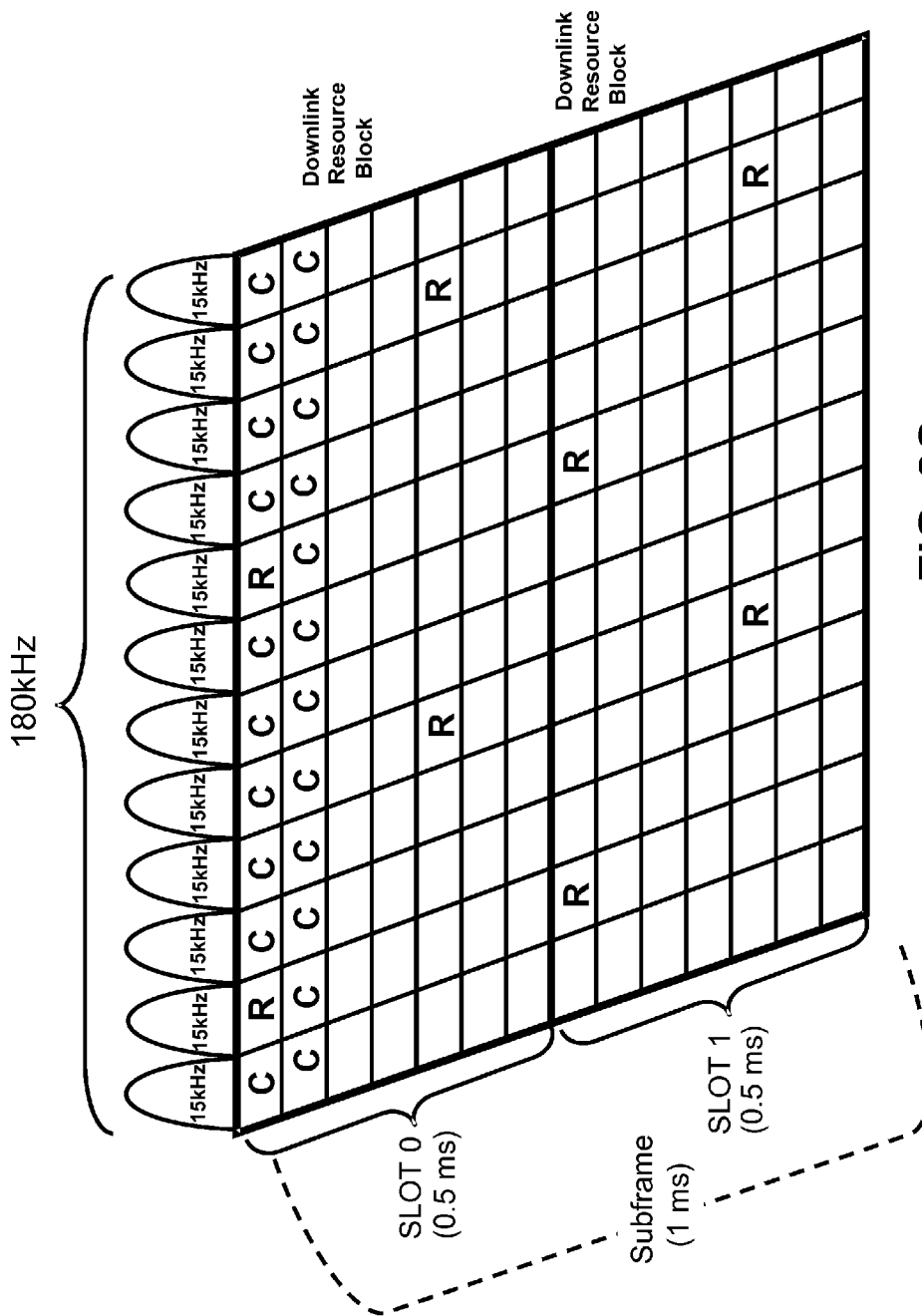
FIG. 2C is a conceptual illustration of two sequential downlink resource blocks, in accordance with an example embodiment.

Downlink resources may be similarly divided into resource blocks. FIG. 2C illustrates an example of resource elements in two successive downlink resource blocks (a Slot 0 resource block and a Slot 1 resource block) for a one antenna port system. In this example, some of the resource elements are labeled "R" to indicate that they are reserved for reference signals transmitted by RAN 102. In addition, some of the resource elements in the first two OFDM symbols are labeled "C" to indicate that they are used to transmit control signaling, such as control signaling in the Physical Control Format Indicator Channel (PCFICH), Physical Downlink Control Channel (PDCCH), and Physical Hybrid ARQ Channel (PHICH). The other resource elements that are unlabeled can be used to transmit user data in the Physical Downlink Shared Channel (PDSCH). It is to be understood that FIG. 2C illustrates only one possible configuration. In other configurations, a downlink resource block could have a greater or fewer number of resource elements available to transmit user data.

The two consecutive slots of time (Slot 0 and Slot 1) are treated as a transmission time interval (TTI) for purposes of LTE's HARQ process. In particular, after a UE has transmitted its data in a TTI, such as shown in FIG. 2B, the UE waits to receive a HARQ response from the RAN (in the PHICH channel) to determine whether the data should be re-transmitted or whether the WCD can transmit additional data. If the HARQ response is an ACK, indicating that the data was successfully received, then the UE can transmit additional data. If the HARQ response is a NACK, indicating that the data was received with one or more errors, then the UE re-transmits the data. The UE may also re-transmit the data if the UE does not receive a HARQ response within a predetermined period of time.

On the other hand, if a UE has been instructed to use TTI bundling, then the UE may transmit the same data to RAN 102 in multiple, consecutive TTIs before waiting for a HARQ response. Similarly, when RAN 102 applies TTI bundling, the RAN 102 may transmit the same data in multiple, consecutive TTIs to the UE before waiting for a HARQ response.

In some embodiments, the RAN 102 may receive a buffer status report from a UE. The buffer status report may include a buffered-data value indicative of an amount of data of the wireless communication being buffered by the UE for transmission via one or more bearers in a bearer group. Different bearers may be grouped together in a Logical Channel Group (LCG), which may be identified by a LCG identification (LCID). And in at least one embodiment, the LCID may indicate information about the wireless communication, such as the particular type of the wireless communication.

As discussed below, the RAN may receive over an interface from a UE, an indication of a wireless communication. The wireless communication is of a particular QoS class and a particular type. In response to receiving the indication, the RAN may determine the particular type of wireless communication and the RAN may determine, based at least in part on the determined particular type of wireless communication, that the RAN should invoke TTI bundling with a bundling size, N, for transmitting data of the wireless communication between the RAN and the UE, where N>1. And in response to determining that the RAN should invoke TTI bundling with the bundling size N for transmitting data of the wireless communication between the RAN and the UE, the RAN may invoke TTI bundling with the bundling size N for transmitting the data of the wireless communication between the RAN and the UE.

B. Example RAN

Figure 3:
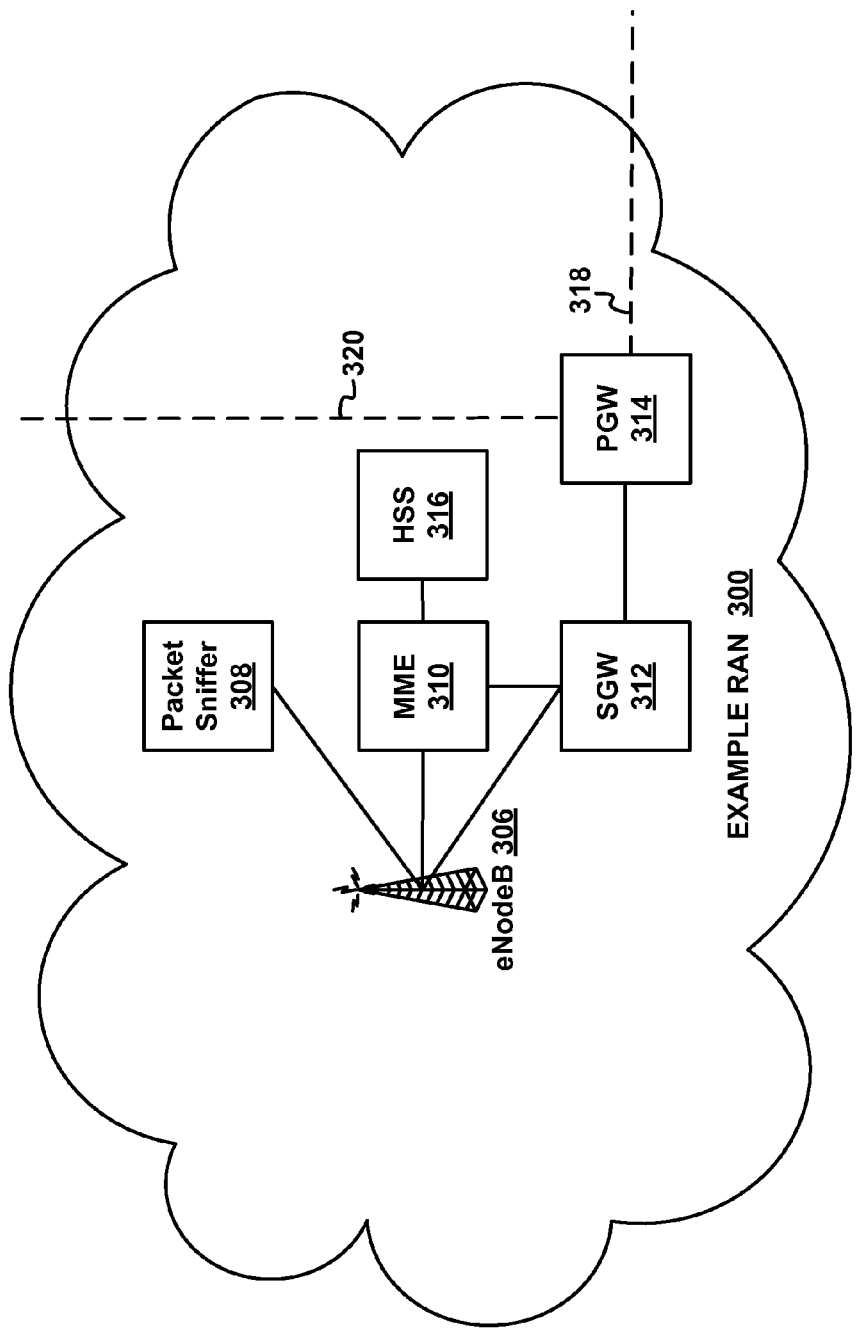
FIG. 3 depicts an example RAN in the context of the example communication system of FIG. 1.

FIG. 3 depicts an example RAN 300, where RAN 300 may represent an arrangement of RAN 102 of FIG. 1. In the illustrated example, RAN 300 is an LTE RAN. RAN 300 is depicted as including an eNodeB (e.g., an LTE base station) 306, a packet sniffer 308, a mobile management entity (MME) 310, a serving gateway (SGW) 312, a packet-data network gateway (PGW) 314, and a home subscriber server (HSS) 316. Other entities could be present in addition to and/or instead of one or more entities depicted in FIG. 3, as this arrangement is presented by way of example. For instance, although FIG. 1 shows only one eNodeB in RAN 300, it is to be understood that RAN 300 could include any number of eNodeBs.

UEs 108, 110, and 112 may be served by eNodeB 306. eNodeB 306 communicates with packet sniffer 308 via a respective communication link, MME 310 via a respective communication link, and SGW 312 via a respective communication link. MME 310 in turn communicates with SGW 312 via a respective communication link, and with HSS 316 via a respective communication link. Further, SGW 312 communicates with PGW 314 via a communication link, and PGW 314 in turn communicates with PSN 104 via a communication link 318 and with PSTN 106 via a communication link 320. Communication link 318 may represent communication link 120. Further, communication link 320 may represent communication like 122.

eNodeB 306 radiates to define one or more wireless coverage areas within which eNodeB 306 can wirelessly communicate with UEs. The wireless coverage areas defined by eNodeB 306 could be a cell that generally surrounds eNodeB 306. Alternatively, eNodeB 306 may define multiple wireless coverage areas, such as sectors. Each sector may be defined by multiple antennas in eNodeB 306 so as to generally correspond to azimuthal angles (e.g., 120°) about eNodeB 306.

eNodeB 306 generally functions to provide wireless communication service to UEs 108, 110, and 112 in their respective coverage areas, as described herein, and to bridge air-interface communications with UEs 108, 110, and 112 on the one hand and backhaul communications with MME 310 on the other hand. And by way of example only, eNodeB 306 may, among other operations, carry out one or more functions described herein as being carried out by RAN 102.

Packet sniffer 308 generally functions to evaluate one or more packets of data of wireless communications received by RAN 300. In some embodiments, the packet sniffer 308 may use deep packet inspection (DPI) to evaluate the received packets of data. The packet sniffer 308 may communicate information about the received packets of data to the eNodeB 306. In some embodiments, the packet sniffer 308 may insert a header into a particular received packet of data and then send the particular received packet of data to the eNodeB 306. And in at least one such example, the header may indicate information about the particular received packet of data.

Further, packet sniffer 308 may be located anywhere within RAN 300 in the communication path between a served UE and an endpoint connected to PSN 104 or PSTN 106. In some embodiments, the packet sniffer 308 may be connected to the eNodeB 306.

MME 310 generally functions to control one or more eNodeBs, and to provide one or more eNodeBs with connections to devices such as SGW 312. SGW 312 in turn may perform various functions such as packet routing and forwarding, mobility anchoring, packet buffering, and the like. Further, PGW 314 may facilitate communication between SGW 312 and PSN 106. Further still, PGW 314 may facilitate communication between SGW 212 and PSTN 108.

In addition, HSS 316 may serve standard functions in RAN 300, such as managing and storing service profile records and also managing authentication information for one or more UEs, such as UE 108, UE 110, and UE 112.

D. Example RAN Entity

Figure 4:
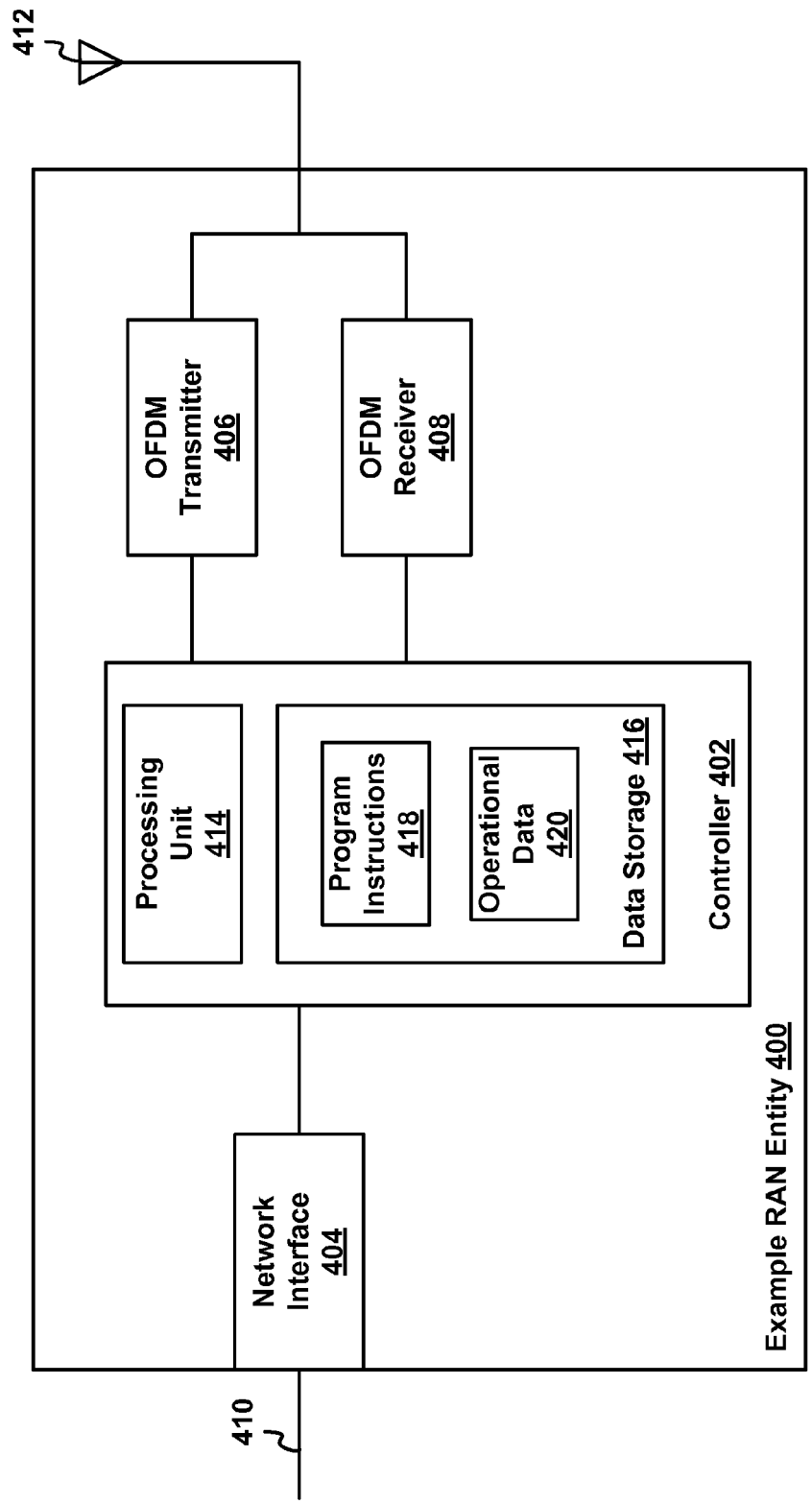
FIG. 4 depicts an example RAN entity.

FIG. 4 depicts an example RAN entity 400, where RAN entity 400 may represent an arrangement of eNodeB 306 in FIG. 3. As shown, RAN entity 400 includes a controller 402 that is coupled to a network interface 404, an OFDM transmitter 406, and an OFDM receiver 408. Network interface 404 is configured to communicate with one or more entities in the RAN via a backhaul connection 410. OFDM transmitter 406 and OFDM receiver 408 are configured to wirelessly communicate with UEs that are operating in the wireless coverage area of RAN entity 400, via one or more antennas, as exemplified in FIG. 4 by antenna 412. More particularly, OFDM transmitter 406 is configured to transmit OFDM signals in a plurality of downlink channels, which may include a downlink shared channel (e.g., a PDSCH channel) and a downlink control channel (e.g., a PDCCH channel). OFDM receiver 408 is configured to receive OFDM signals in a plurality of uplink channels, including an uplink shared channel (e.g., a PUSCH channel).

Controller 402 could be configured to control the functioning of RAN entity 400. Thus, in relation to TTI bundling, the controller could be configured to perform any of the functions described herein. Controller 402 could be implemented using hardware, software, and/or firmware. In an example embodiment, controller 402 includes a processing unit 414 and data storage 416. Data storage 416 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 416 may store program instructions 418 and operational data 420. Program instructions 418 could be executable instructions that, when executed by processing unit 414, cause RAN entity 400 to perform functions, such as any of the RAN functions described herein. Operational data 420 may include any type of data that may be generated or used by controller 402.

E. Example UE

Figure 5:
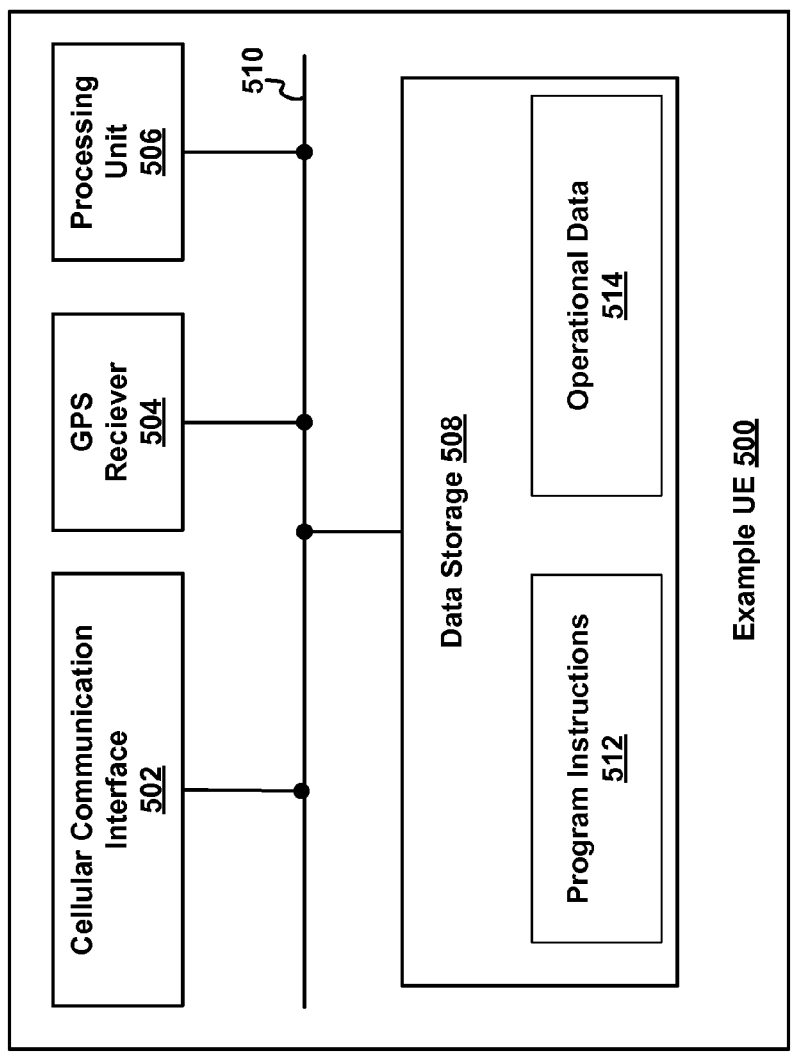
FIG. 5 depicts an example UE.

FIG. 5 depicts an example UE 500, where UE 500 may represent an arrangement of UEs 108, 110, and 112 in FIG. 1. As shown, UE 500 includes a cellular communication interface 502, a global positioning system (GPS) receiver 504, a processing unit 506, and data storage 508, all of which may be coupled together by a system bus, network, or other communication mechanism 510.

Cellular communication interface 502 may comprise one or more antennae or one or more chipsets adapted to facilitate communications with one or more base stations over respective air interfaces. As one example, one such chipset could be suited for LTE communication. As another example, one such chipset could be suited for CDMA (e.g., Evolution-Data Optimized (EV-DO)) communication. Cellular communication interface 502 may also or instead be arranged to communicate according to one or more other types of cellular communication (e.g., protocols) mentioned herein and/or any others now known or later developed. Further, GPS receiver 504 may be any known or later developed GPS receiver, suitable for receiving and decoding GPS satellite signals for location and timing purposes, among other purposes.

Processing unit 506 may comprise one or more general-purpose processors and/or one or more special-purpose processors, and may be integrated in whole or in part with cellular communication interface 502. Data storage 508 could be any type of non-transitory computer readable medium and may comprise one or more volatile and/or non-volatile storage components (such as magnetic, optical, flash, or other non-transitory storage), and may be integrated in whole or in part with processing unit 506. As shown, data storage 508 may hold program instructions 512 executable by processing unit 506 for carrying out various user equipment device functions described herein. Additionally, data storage 508 may hold operational data 514 which comprises information that is collected and stored as a result of the functions carried out by executed program instructions 512. Other configurations are possible as well.

UE 500 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

F. Example Packet of Data

Figure 6:
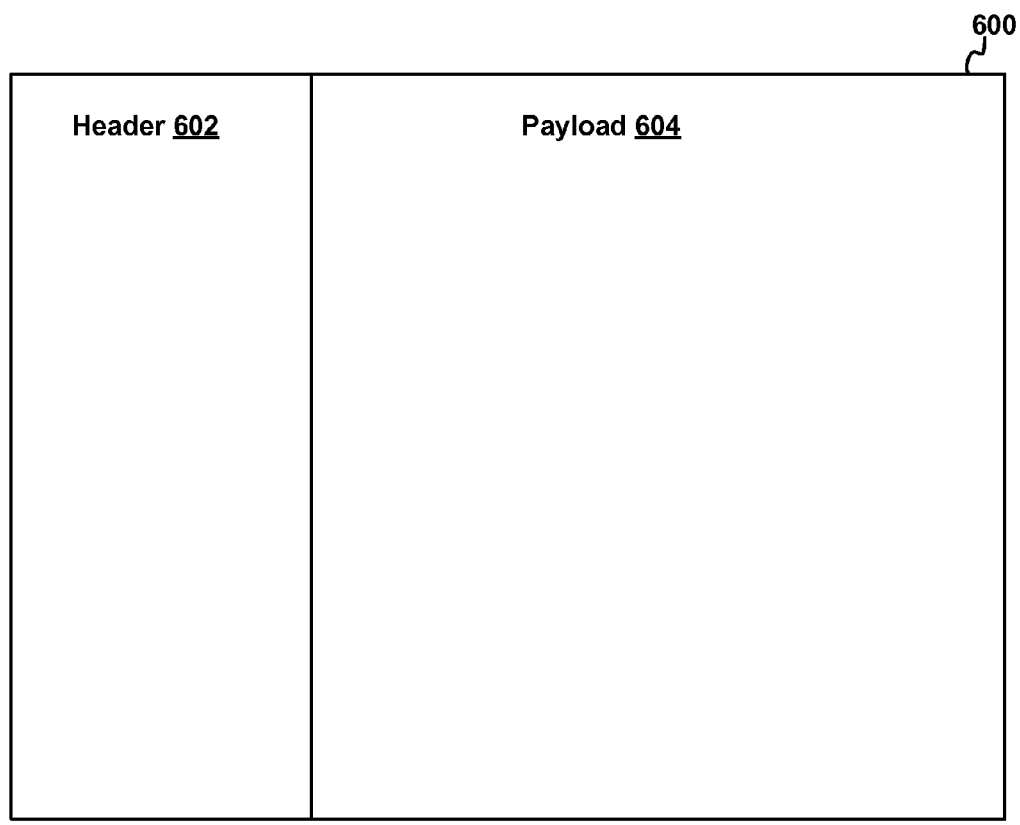
FIG. 6 depicts an example packet of data of a wireless communication.

FIG. 6 depicts an example packet of data 600, where packet of data 600 may represent an arrangement of a packet of data of a wireless communication transmitted between RAN 102 and a UE, such as UEs 108, 110, and 112, in a communication session in FIG. 1. As shown, packet of data 600 includes a header 602 and a payload 604. Header 602 may indicate information about the packet of data 600. For example, when packet of data 600 is of a wireless communication of a particular type, the header 602 may indicate a particular type of the wireless communication. Further, payload 604 may include data, such as data generated or stored from the particular type of wireless communication.

In some embodiments, when packet of data 600 is received by RAN 102, a RAN entity (e.g., packet sniffer 308) may insert identifying information into header 602 of packet of data 600. With this arrangement, RAN 102 may be able to correlate subsequent packets of data of the wireless communication.

III. Example Operation

Figure 7:
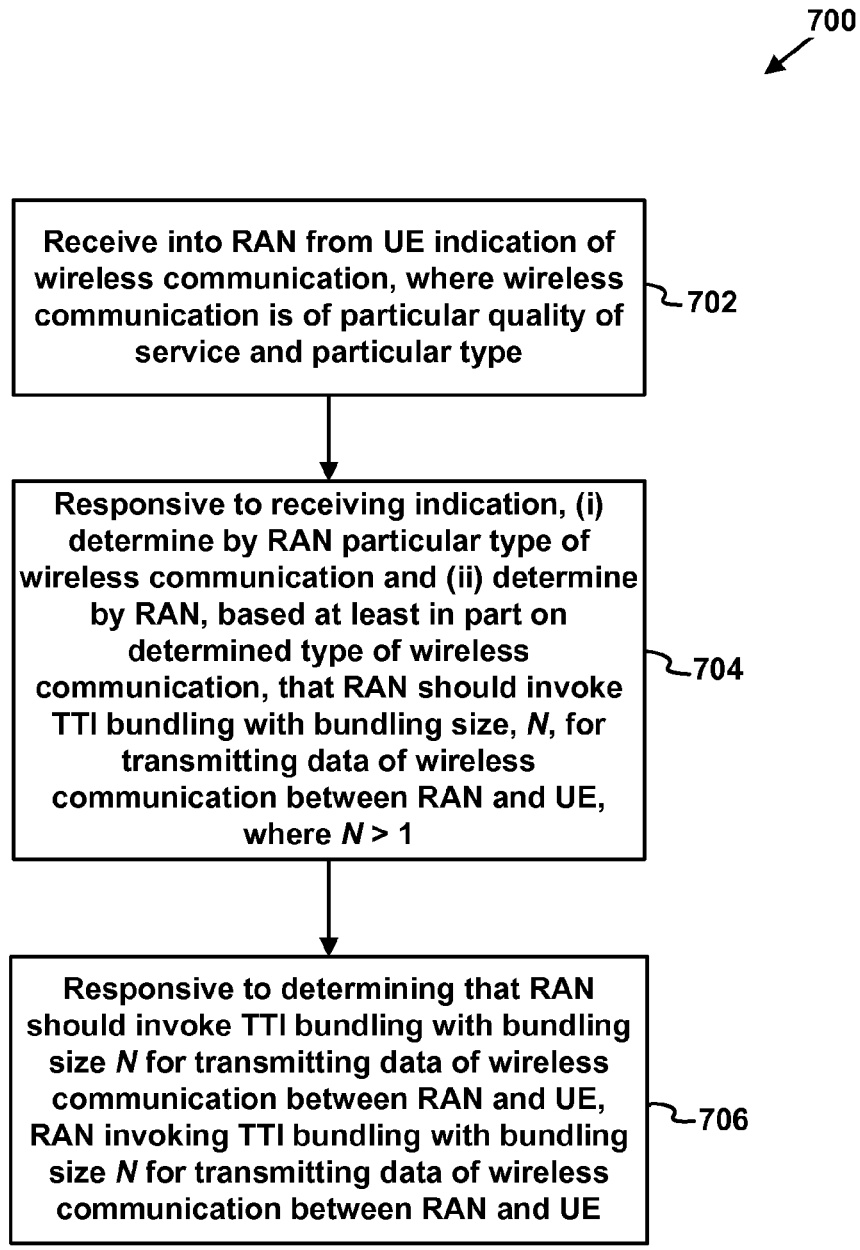
FIG. 7 depicts functions carried out in accordance with at least one embodiment.

FIG. 7 is a flowchart that depicts functions carried out in accordance with at least one embodiment. More particularly, FIG. 7 depicts a method 700. Method 700 could be carried out by various different entities in various different embodiments. In at least one embodiment, method 700 may be carried out by a RAN, such as RAN 102. Further, method 700 may be carried out by a RAN entity, such as eNodeB 306. And method 700 could be carried out by other entities and/or types of entities as well, as these are listed here by way of example only.

Method 700 begins at block 702 with receiving into a RAN, over an air interface from a user UE, an indication of a wireless communication, wherein the wireless communication is of a particular quality of service and a particular type. In some embodiments, the particular quality of service may include a particular QoS class.

Method 700 continues at block 704 with responsive to receiving the indication, (i) determining by the RAN the particular type of the wireless communication and (ii) determining by the RAN, based at least in part on the determined particular type of the wireless communication, that the RAN should invoke TTI bundling with a bundling size, N, for transmitting data of the wireless communication between the RAN and the UE, wherein N>1.

Method 700 continues at block 706 with responsive to determining that the RAN should invoke TTI bundling with the bundling size N for transmitting data of the wireless communication between the RAN and the UE, the RAN invoking TTI bundling with the bundling size N for transmitting the data of the wireless communication between the RAN and the UE.

Method 700 may be performed with respect to downlink and/or uplink communication. For instance, in some embodiments, the RAN invoking TTI bundling with the bundling size N for transmitting the data of the wireless communication between the RAN and the UE may involve the RAN applying TTI bundling with the bundling size N for transmitting downlink communication to the UE. Moreover, in some embodiments, the RAN invoking TTI bundling with the bundling size N for transmitting the data of the wireless communication between the RAN and the UE may involve the RAN directing the UE to apply TTI bundling with the bundling size N for transmitting uplink communication to the RAN.

Moreover, in some embodiments, the wireless communication may be communication by a particular type of communication application running on the UE, wherein the particular type of the wireless communication may include the particular type of communication application, wherein determining by the RAN the particular type of the wireless communication may involve determining by the RAN the particular type of communication application, and wherein determining by the RAN, based at least in part on the determined particular type of wireless communication, that the RAN should invoke TTI bundling with the bundling size N may involve determining by the RAN, based at least in part on the determined particular type of communication application, that the RAN should invoke TTI bundling with the bundling size N.

Further, in some embodiments the wireless communication may be communication by a particular communication application running on the UE, wherein the particular type of the wireless communication may include the particular communication application, wherein determining by the RAN the particular type of the wireless communication may involve determining by the RAN the particular communication application, and wherein determining by the RAN, based at least in part on the determined particular type of wireless communication, that the RAN should invoke TTI bundling with the bundling size N may involve determining by the RAN, based at least in part on the determined particular communication application, that the RAN should invoke TTI bundling with the bundling size N.

Further still, in some embodiments, the indication of the wireless communication may be a packet of data of the wireless communication that comprises an indication of the particular type of wireless communication. And in at least one such embodiment, determining by the RAN the particular type of the wireless communication may involve using deep packet inspection to evaluate the received packet of data. Moreover, in some embodiments, the indication of the wireless communication may be a buffer status report that comprises an indication of the particular type of wireless communication.

Further, in some embodiments, the RAN may have access to data that correlates various particular types of wireless communication with whether the RAN should invoke TTI bundling for transmitting the data of the wireless communication, and if so, the bundling size N that should be used, and determining by the RAN, based at least in part on the determined particular type of the wireless communication, that the RAN should invoke TTI bundling with the bundling size N for transmitting data of the wireless communication between the RAN and the UE may involve the RAN referring to the data that correlates various particular types of wireless communication with whether the RAN should invoke TTI bundling for transmitting the data of the wireless communication, and if so, the bundling size N that should be used. And in at least one such embodiment, the data that correlates various particular types of wireless communication with whether the RAN should invoke TTI bundling for transmitting the data of the wireless communication, and if so, the bundling size N that should be used may take the form of a table that associates a particular type of wireless communication with whether the RAN should invoke TTI bundling for transmitting the data of the wireless communication, and if so, the bundling size N that should be used. The table could be specific to a particular UE, or the table could apply to all UEs being served by the RAN or to a particular class or group of UEs.

The data that correlates various particular types of wireless communications with whether the RAN should invoke TTI bundling for transmitting the data of the wireless communication, and if so, the bundling size N that should be used could take various different forms in various different embodiments. As one example, when the particular type of wireless communication includes a particular type of communication application running on the UE and the particular type of communication is Web browsing, the data may indicate that TTI bundling should be invoked for transmitting uplink and/or downlink communication. And in such an example, the data may indicate that the bundling size of 4 should be used. As another example, when the particular type of communication application is online gaming, the data may indicate that TTI bundling should be invoked for transmitting uplink and/or downlink communication. And in such an example, the data may indicate that the bundling size N of 2 should be used. As another example, when the particular type of communication application is video streaming, the data may indicate that TTI bundling should be invoked for transmitting downlink communication. And in such an example, the data may indicate that the bundling size of 4 should be used. As yet another example, when the particular type of communication application is peer-to-peer, the data may indicate that TTI bundling should not be invoked for uplink communication.

Further still, in some embodiments, the data of the wireless communication may be transmitted over a shared channel, and determining by the RAN that the RAN should invoke TTI bundling with bundling size N for transmitting the data of the wireless communication may involve determining by the RAN, based at least in part on (i) the particular type of wireless communication and (ii) a load on the shared channel, that the RAN should invoke TTI bundling with the bundling size N for transmitting data of the wireless communication over the shared channel between the RAN and the UE.

And in at least one such embodiment, the RAN may have access to data that correlates various particular types of wireless communication and loads on the shared channel with whether the RAN should invoke TTI bundling for transmitting the data of the wireless communication, and if so, the bundling size N that should be used, and determining by the RAN, based at least in part on the determined particular type of the wireless communication, that the RAN should invoke TTI bundling with the bundling size N for transmitting data of the wireless communication between the RAN and the UE may involve the RAN referring to the data that correlates various particular types of wireless communication and loads on the shared channel with whether the RAN should invoke TTI bundling for transmitting the data of the wireless communication, and if so, the bundling size N that should be used. And in at least one such embodiment, the data that correlates various particular types of wireless communication and loads on the shared channel with whether the RAN should invoke TTI bundling for transmitting the data of the wireless communication, and if so, the bundling size N that should be used may take the form of a table that associates a particular type of wireless communication and a particular type of load (e.g., high, medium, and low) on the shared channel with whether the RAN should invoke TTI bundling for transmitting the data of the wireless communication, and if so, the bundling size N that should be used. The table could be specific to a particular UE, or the table could apply to all UEs being served by the RAN or to a particular class or group of UEs.

The data that correlates various particular types of wireless communications and loads on the shared channel with whether the RAN should invoke TTI bundling for transmitting the data of the wireless communication, and if so, the bundling size N that should be used could take various different forms in various different embodiments. As one example, when the particular type of wireless communication includes a particular type of communication application running on the UE, the particular type of communication application is Web browsing, and the particular type of load on the shared channel is high, the data may indicate that TTI bundling should not be invoked for transmitting uplink and/or downlink communication. As another example, when the particular type of communication application is Web browsing and the particular type of load on the channel is medium, the data may indicate that TTI bundling should be invoked for transmitting uplink and/or downlink communication. And in such an example, the data may indicate that the bundling size N of 2 should be used. As another example, when the particular type of communication application is Web browsing and the particular load on the shared channel is low, the data may indicate that TTI bundling should be invoked for transmitting uplink and/or downlink communication. And in such an example, the data may indicate that the bundling size of 4 should be used.

The load on the shared channel could be measured in various different ways in various different embodiments, such as tonnage of data transmitted over the shared channel, the number of UEs transmitting data over the shared channel, a combination of the tonnage of data transmitted and the number of UEs transmitting data, etc.

Figure 8:
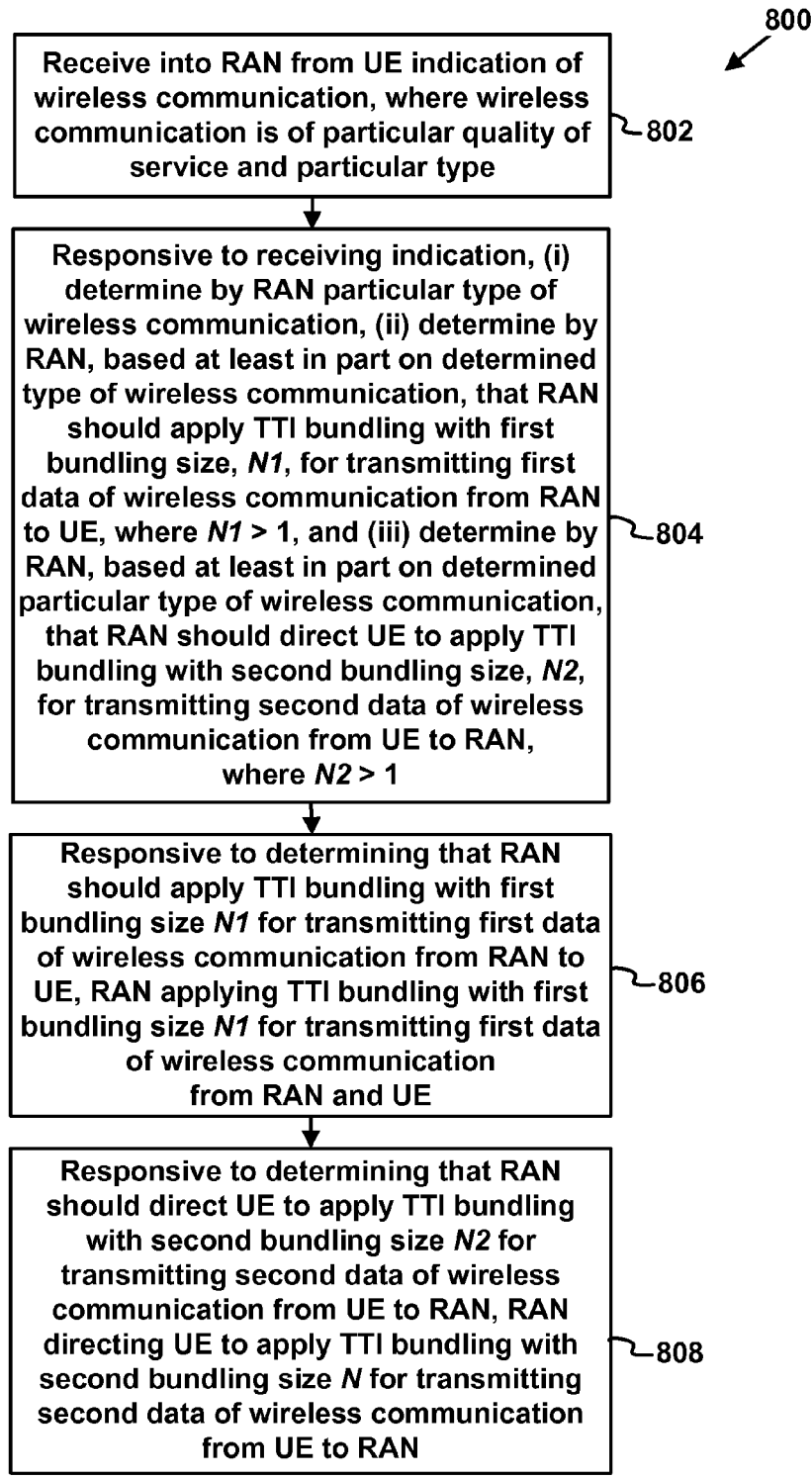
FIG. 8 depicts functions carried out in accordance with at least one other embodiment.

FIG. 8 is a flowchart that depicts functions carried out in accordance with at least one embodiment. More particularly, FIG. 8 depicts a method 800. Method 800 could be carried out by various different entities in various different embodiments. In at least one embodiment, method 800 may be carried out by a RAN, such as RAN 102. Further, method 800 may be carried out by a RAN entity, such as eNodeB 306. And method 800 could be carried out by other entities and/or types of entities as well, as these are listed here by way of example only.

Method 800 begins at block 802 with receiving into a RAN, over an air interface from a UE, an indication of a wireless communication, wherein the wireless communication is of a particular quality of service and a particular type. In some embodiments, the particular quality of service may include a particular QoS class.

Method 800 continues at block 804 with responsive to receiving the indication, (i) determining by the RAN a particular type of the wireless communication, (ii) determining by the RAN, based at least in part on the determined particular type of the wireless communication, that the RAN should apply TTI bundling with a first bundling size, N1, for transmitting first data of the wireless communication from the RAN to the UE, wherein N1>1, and (iii) determining by the RAN, based at least in part on the determined particular type of wireless communication, that the RAN should direct the UE to apply TTI bundling with a second bundling size, N2, for transmitting second data of the wireless communication from the UE to the RAN, wherein N2>1.

Method 800 continues at block 806 with responsive to determining that the RAN should apply TTI bundling with the first bundling size N1 for transmitting first data of the wireless communication from the RAN to the UE, the RAN applying TTI bundling with the first bundling size N1 for transmitting the first data of the wireless communication from the RAN to the UE. In some embodiments, the first data of the wireless communication may include downlink communication.

Method 800 continues at block 808 with responsive to determining that the RAN should direct the UE to apply TTI bundling with the second bundling size N2 for transmitting second data of the wireless communication from the UE to the RAN, the RAN directing the UE to apply TTI bundling with the second bundling size N2 for transmitting the second data of the wireless communication from the UE to the RAN. In some embodiments, the second data of the wireless communication may be uplink communication. Moreover, in some embodiments, the first bundling size N1 may be greater than the second bundling size N2. Further, in some embodiments, the first bundling size N1 may be less than the second bundling size N2.

Moreover, in some embodiments, the wireless communication may be communication by a particular type of communication application running on the UE, wherein the particular type of the wireless communication may include the particular type of communication application, wherein determining by the RAN the particular type of the wireless communication may involve determining by the RAN the particular type of communication application, wherein determining by the RAN, based at least in part on the determined particular type of wireless communication, that the RAN should invoke TTI bundling with the first bundling size N1 may involve determining by the RAN, based at least in part on the determined particular type of communication application, that the RAN should invoke TTI bundling with the first bundling size N1, and wherein determining by the RAN, based at least in part on the determined particular type of wireless communication, that the RAN should invoke TTI bundling with the second bundling size N2 may involve determining by the RAN, based at least in part on the determined particular type of communication application, that the RAN should invoke TTI bundling with the second bundling size N2.

Further, in some embodiments the wireless communication may be communication by a particular communication application running on the UE, wherein the particular type of the wireless communication may include the particular communication application, wherein determining by the RAN the particular type of the wireless communication may involve determining by the RAN the particular communication application, wherein determining by the RAN, based at least in part on the determined particular type of wireless communication, that the RAN should invoke TTI bundling with the first bundling size N1 may involve determining by the RAN, based at least in part on the determined particular communication application, that the RAN should invoke TTI bundling with the first bundling size N1, and wherein determining by the RAN, based at least in part on the determined particular type of wireless communication, that the RAN should invoke TTI bundling with the second bundling size N2 may involve determining by the RAN, based at least in part on the determined particular communication application, that the RAN should invoke TTI bundling with the second bundling size N2.

Further still, in some embodiments, the indication of the wireless communication may be a packet of data of the wireless communication that comprises an indication of the particular type of wireless communication. And in at least one such embodiment, determining by the RAN the particular type of the wireless communication may involve using deep packet inspection to evaluate the received packet of data. Moreover, in some embodiments, the indication of the wireless communication may be a buffer status report that comprises an indication of the particular type of wireless communication.

Further, in some embodiments, the RAN may have access to data that correlates various particular types of wireless communication with whether the RAN should invoke TTI bundling for transmitting the data of the wireless communication, and if so, the first bundling size N1 that should be used, and determining by the RAN, based at least in part on the determined particular type of the wireless communication, that the RAN should invoke TTI bundling with the first bundling size N1 for transmitting first data of the wireless communication from the RAN to the UE may involve the RAN referring to the data that correlates various particular types of wireless communication with whether the RAN should invoke TTI bundling for transmitting the first data of the wireless communication, and if so, the first bundling size N1 that should be used. And in at least one such embodiment, the data that correlates various particular types of wireless communication with whether the RAN should invoke TTI bundling for transmitting the first data of the wireless communication, and if so, the first bundling size N1 that should be used may take the form of a table that associates a particular type of wireless communication with whether the RAN should invoke TTI bundling for transmitting the first data of the wireless communication, and if so, the first bundling size N that should be used. The table could be specific to a particular UE, or the table could apply to all UEs being served by the RAN or to a particular class or group of UEs.

Further still, in some embodiments, the data of the wireless communication may be transmitted over a shared channel, and determining by the RAN that the RAN should invoke TTI bundling with first bundling size N1 for transmitting the first data of the wireless communication may involve determining by the RAN, based at least in part on (i) the particular type of wireless communication and (ii) a load on the shared channel, that the RAN should invoke TTI bundling with the first bundling size N for transmitting first data of the wireless communication over the shared channel between the RAN and the UE. And in at least one such embodiment, the RAN may have access to data that correlates various particular types of wireless communication and loads on the shared channel with whether the RAN should invoke TTI bundling for transmitting the first data of the wireless communication, and if so, the first bundling size N1 that should be used, and determining by the RAN, based at least in part on the determined particular type of the wireless communication, that the RAN should invoke TTI bundling with the first bundling size N1 for transmitting first data of the wireless communication between the RAN and the UE may involve the RAN referring to the data that correlates various particular types of wireless communication and loads on the shared channel with whether the RAN should invoke TTI bundling for transmitting the first data of the wireless communication, and if so, the first bundling size N1 that should be used. And in at least one such embodiment, the data that correlates various particular types of wireless communication and loads on the shared channel with whether the RAN should invoke TTI bundling for transmitting the first data of the wireless communication, and if so, the first bundling size N1 that should be used may take the form of a table that associates a particular type of wireless communication and a particular type of load on the shared channel with whether the RAN should invoke TTI bundling for transmitting the data of the wireless communication, and if so, the first bundling size N1 that should be used. The table could be specific to a particular UE, or the table could apply to all UEs being served by the RAN or to a particular class or group of UEs.

Moreover, in some embodiments, the RAN may have access to data that correlates various particular types of wireless communication with whether the RAN should invoke TTI bundling for transmitting second data of the wireless communication, and if so, the second bundling size N2 that should be used, and determining by the RAN, based at least in part on the determined particular type of the wireless communication, that the RAN should invoke TTI bundling with the second bundling size N2 for transmitting second data of the wireless communication from the RAN to the UE may involve the RAN referring to the data that correlates various particular types of wireless communication with whether the RAN should invoke TTI bundling for transmitting the second data of the wireless communication, and if so, the second bundling size N2 that should be used. And in at least one such embodiment, the data that correlates various particular types of wireless communication with whether the RAN should invoke TTI bundling for transmitting the second data of the wireless communication, and if so, the second bundling size N2 that should be used may take the form of a table that associates a particular type of wireless communication with whether the RAN should invoke TTI bundling for transmitting the second data of the wireless communication, and if so, the second bundling size N2 that should be used. The table could be specific to a particular UE, or the table could apply to all UEs being served by the RAN or to a particular class or group of UEs.

Further, in some embodiments, the second data of the wireless communication may be transmitted over a shared channel, and determining by the RAN that the RAN should invoke TTI bundling with second bundling size N2 for transmitting the data of the wireless communication may involve determining by the RAN, based at least in part on (i) the particular type of wireless communication and (ii) a load on the shared channel, that the RAN should invoke TTI bundling with the second bundling size N2 for transmitting second data of the wireless communication over the shared channel between the RAN and the UE. And in at least one such embodiment, the RAN may have access to data that correlates various particular types of wireless communication and loads on the shared channel with whether the RAN should invoke TTI bundling for transmitting the data of the wireless communication, and if so, the second bundling size N2 that should be used, and determining by the RAN, based at least in part on the determined particular type of the wireless communication, that the RAN should invoke TTI bundling with the second bundling size N2 for transmitting data of the wireless communication between the RAN and the UE may involve the RAN referring to the data that correlates various particular types of wireless communication and loads on the shared channel with whether the RAN should invoke TTI bundling for transmitting the second data of the wireless communication, and if so, the second bundling size N2 that should be used. And in at least one such embodiment, the data that correlates various particular types of wireless communication and loads on the shared channel with whether the RAN should invoke TTI bundling for transmitting the second data of the wireless communication, and if so, the second bundling size N2 that should be used may take the form of a table that associates a particular type of wireless communication and a particular type of load on the shared channel with whether the RAN should invoke TTI bundling for transmitting the data of the wireless communication, and if so, the second bundling size N2 that should be used. The table could be specific to a particular UE, or the table could apply to all UEs being served by the RAN or to a particular class or group of UEs.

IV. Conclusion

Exemplary embodiments have been described above. It should be understood, however, that variations from these embodiments are possible, while remaining within the true spirit and scope of the invention.

What is claimed is:

1. A method comprising:
   receiving into a radio access network (RAN), over an air interface from a user equipment device (UE), an indication of a wireless communication, wherein the wireless communication is of a particular quality of service and a particular type;
   responsive to receiving the indication, (i) determining by the RAN the particular type of the wireless communication and (ii) determining by the RAN, based at least in part on the determined particular type of the wireless communication, that the RAN should invoke transmission time interval (TTI) bundling with a bundling size, N, for transmitting data of the wireless communication between the RAN and the UE, wherein N>1; and
   responsive to determining that the RAN should invoke TTI bundling with the bundling size N for transmitting data of the wireless communication between the RAN and the UE, the RAN invoking TTI bundling with the bundling size N for transmitting the data of the wireless communication between the RAN and the UE.

2. The method of claim 1, wherein the wireless communication is communication by a particular type of communication application running on the UE, wherein the particular type of the wireless communication comprises the particular type of communication application, wherein determining by the RAN the particular type of the wireless communication comprises determining by the RAN the particular type of communication application, and wherein determining by the RAN, based at least in part on the determined particular type of wireless communication, that the RAN should invoke TTI bundling with the bundling size N comprises determining by the RAN, based at least in part on the determined particular type of communication application, that the RAN should invoke TTI bundling with the bundling size N.

3. The method of claim 1, wherein the wireless communication is communication by a particular communication application running on the UE, wherein the particular type of the wireless communication comprises the particular communication application, wherein determining by the RAN the particular type of the wireless communication comprises determining by the RAN the particular communication application, and wherein determining by the RAN, based at least in part on the determined particular type of wireless communication, that the RAN should invoke TTI bundling with the bundling size N comprises determining by the RAN, based at least in part on the determined particular communication application, that the RAN should invoke TTI bundling with the bundling size N.

4. The method of claim 1, wherein the RAN invoking TTI bundling with the bundling size N for transmitting the data of the wireless communication between the RAN and the UE comprises the RAN applying TTI bundling with the bundling size N for transmitting downlink communication to the UE.

5. The method of claim 1, wherein the RAN invoking TTI bundling with the bundling size N for transmitting the data of the wireless communication between the RAN and the UE comprises the RAN directing the UE to apply TTI bundling with the bundling size N for transmitting uplink communication to the RAN.

6. The method of claim 1, wherein the indication of the wireless communication is a packet of data of the wireless communication that comprises an indication of the particular type of wireless communication.

7. The method of claim 6, wherein determining by the RAN the particular type of the wireless communication comprises using deep packet inspection to evaluate the received packet of data.

8. The method of claim 1, wherein the indication of the wireless communication is a buffer status report that comprises an indication of the particular type of wireless communication.

9. The method of claim 1, wherein the RAN has access to data that correlates various particular types of wireless communication with whether the RAN should invoke TTI bundling for transmitting the data of the wireless communication, and if so, the bundling size N that should be used, and wherein determining by the RAN, based at least in part on the determined particular type of the wireless communication, that the RAN should invoke TTI bundling with the bundling size N for transmitting data of the wireless communication between the RAN and the UE comprises the RAN referring to the data that correlates various particular types of wireless communication with whether the RAN should invoke TTI bundling for transmitting the data of the wireless communication, and if so, the bundling size N that should be used.

10. The method of claim 1, wherein the data of the wireless communication is transmitted over a shared channel, and wherein determining by the RAN that the RAN should invoke TTI bundling with bundling size N for transmitting the data of the wireless communication comprises determining by the RAN, based at least in part on (i) the particular type of wireless communication and (ii) a load on the shared channel, that the RAN should invoke TTI bundling with the bundling size N for transmitting data of the wireless communication over the shared channel between the RAN and the UE.

11. A method comprising:
receiving into a radio access network (RAN), over an air interface from a user equipment device (UE), an indication of a wireless communication, wherein the wireless communication is of a particular quality of service and a particular type;
responsive to receiving the indication, (i) determining by the RAN a particular type of the wireless communication, (ii) determining by the RAN, based at least in part on the determined particular type of the wireless communication, that the RAN should apply transmission time interval (TTI) bundling with a first bundling size, N1, for transmitting first data of the wireless communication from the RAN to the UE, wherein N1>1, and (iii) determining by the RAN, based at least in part on the determined particular type of wireless communication, that the RAN should direct the UE to apply TTI bundling with a second bundling size, N2, for transmitting second data of the wireless communication from the UE to the RAN, wherein N2>1;
responsive to determining that the RAN should apply TTI bundling with the first bundling size N1 for transmitting data of the wireless communication from the RAN to the UE, the RAN applying TTI bundling with the first bundling size N1 for transmitting the first data of the wireless communication from the RAN to the UE; and
responsive to determining that the RAN should direct the UE to apply TTI bundling with the second bundling size N2 for transmitting data of the wireless communication from the UE to the RAN, the RAN directing the UE to apply TTI bundling with the second bundling size N2 for transmitting the second data of the wireless communication from the UE to the RAN.

12. A system comprising:
a communication interface;
a processing unit;
non-transitory data storage; and
program instructions stored in the non-transitory data storage and executable by the processing unit to carry out functions comprising:
receiving over an air interface from a user equipment device (UE), an indication of a wireless communication, wherein the wireless communication is of a particular quality of service and a particular type,
responsive to receiving the indication, (i) determining the particular type of the wireless communication and (ii) determining, based at least in part on the determined particular type of the wireless communication, that transmission time interval (TTI) bundling with a bundling size, N, should be invoked for transmitting data of the wireless communication, wherein N>1, and
responsive to determining that TTI bundling with the bundling size N for transmitting data of the wireless communication should be invoked, invoking TTI bundling with the bundling size N for transmitting the data of the wireless communication.

13. The system claim 12, wherein the wireless communication is communication by a particular type of communication application running on the UE, wherein the particular type of the wireless communication comprises the particular type of communication application, wherein determining the particular type of the wireless communication comprises determining the particular type of communication application, and wherein determining, based at least in part on the determined particular type of wireless communication, that TTI bundling with the bundling size N should be invoked comprises determining, based at least in part on the determined particular type of communication application, that TTI bundling with the bundling size N should be invoked.

14. The system of claim 12, wherein the wireless communication is communication by a particular communication application running on the UE, wherein the particular type of the wireless communication comprises the particular communication application, wherein determining the particular type of the wireless communication comprises determining the particular communication application, and wherein determining, based at least in part on the determined particular type of wireless communication, that TTI bundling with the bundling size N should be invoked comprises determining, based at least in part on the determined particular communication application, that TTI bundling with the bundling size N should be invoked.

15. The system of claim 12, wherein invoking TTI bundling with the bundling size N for transmitting the data of the wireless communication comprises applying TTI bundling with the bundling size N for transmitting downlink communication to the UE.

16. The system of claim 12, wherein invoking TTI bundling with the bundling size N for transmitting the data of the wireless communication comprises directing the UE to apply TTI bundling with the bundling size N for transmitting uplink communication.

17. The system of claim 12, wherein the indication of the wireless communication is a packet of data of the wireless communication that comprises an indication of the particular type of wireless communication.

18. The system of claim 12, wherein the indication of the wireless communication is a buffer status report, and wherein the buffer status report comprises an indication of the particular type of wireless communication.

19. The system of claim 12, further comprising data that correlates various particular types of wireless communication with whether TTI bundling should be invoked for transmitting the data of the wireless communication, and if so, the bundling size N that should be used, and wherein determining, based at least in part on the determined particular type of the wireless communication, that TTI bundling with the bundling size N should be invoked for transmitting data of the wireless communication between the RAN and the UE comprises referring to the data that correlates various particular types of wireless communication with whether TTI bundling should be invoked for transmitting the data of the wireless communication, and if so, the bundling size N that should be used.

20. The system of claim 12, wherein the data of the wireless communication is transmitted over a shared channel, and wherein determining that TTI bundling with bundling size N should be invoked for transmitting the data of the wireless communication comprises determining, based at least in part on (i) the particular type of wireless communication and (ii) a load on the shared channel, that TTI bundling with the bundling size N should be invoked for transmitting data of the wireless communication over the shared channel.

\* \* \* \* \*